3,454,629
NOVEL PHENYLALANINE COMPOUNDS
Hans Ulrich Daeniker, Reinach, Basel-Land, Switzerland, assignor to Ciba Corporation, New York, N.Y., a corporation of Delaware
No Drawing. Filed Aug. 14, 1963, Ser. No. 301,960
Claims priority, application Switzerland, Aug. 17, 1962, 9,851/62; Nov. 15, 1962, 13,354/62; Feb. 13, 1963, 1,855/63; July 5, 1963, 8,421/63
Int. Cl. C07c 101/72, 121/66
U.S. Cl. 260—519         13 Claims The present invention relates to new amino acids. More especially it concerns amino acids of the formula

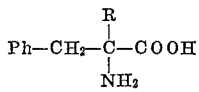

in which Ph represents a meta-halogenophenyl radical carrying a free, etherified or esterified hydroxyl group, and R represents a lower alkyl radical, and their salts.

Halogen atoms are, for example, fluorine, chlorine or bromine, or the pseudohalogen trifluoromethyl.

Etherified hydroxyl groups are primarily hydroxyl groups substituted by aliphatic, araliphatic or cycloaliphatic radicals. There may be mentioned, for example, lower alkoxy groups such as ethoxy, propoxy, isopropoxy, butoxy, isobutoxy or pentyloxy and in the first place methoxy; lower alkenyloxy groups such as allyloxy; phenyl-lower alkoxy groups such as benzyloxy, 1- or 2-phenylethyloxy groups in which the aromatic radicals may contain substituents, for example lower alkyl or alkoxy radicals, halogen atoms, nitro or amino groups; or cycloalkoxy or cycloalkenyloxy groups such as cyclopentyloxy, cyclopentenyloxy, cyclohexyloxy or cyclohexenyloxy groups.

Suitable esterified hydroxyl groups are, for example, those in which the acyl radical is derived from a lower alkanoic acid, such as acetic, propionic or pivalic acid or from a benzoic acid, such as benzoic acid itself or a benzoic acid whose aromatic radical is substituted as mentioned above, or an etherified hydroxyformic acid such as benzyloxyformic acid or a lower alkoxyformic acid, e.g., tertiary butyloxyformic acid. The free, esterified or etherified hydroxyl group is advantageously in para-position.

The lower alkyl radical R is, for example, an ethyl, propyl, isopropyl, butyl, isobutyl, pentyl or isopentyl radical, or above all a methyl group.

Apart from the aforesaid radicals the phenyl radical may contain further substituents, such as hydroxyl groups, or more especially halogen atoms, substituted hydroxyl groups, for example the above-mentioned etherified or esterified hydroxyl groups, nitro or amino groups, such as free or substituted amino groups, for example acylamino groups or mono- or di-lower alkylamino groups. Particularly suitable acyl radicals are those mentioned above for the esterified hydroxyl group.

The new compounds possess valuable pharmacological, especially hypotensive properties; in experiments on rats, for example, they lower the blood pressure of these animals and are therefore useful as antihypertensive agents. They are also suitable as intermediates in the manufacture of valuable compounds. The new compounds are substantially more stable than the known β-(para-meta-dioxyphenyl)-α-methyl-α-aminopropionic acids.

Particularly valuable hypotensive agents are the compounds of the formulae

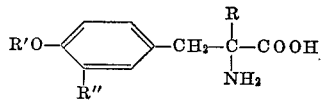

and

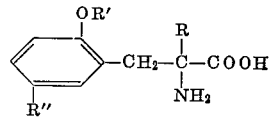

where R and R′ each is a lower alkyl radical and R′ may also represent hydrogen, and R″ represents fluorine or chlorine, and more especially the compounds of the formulae

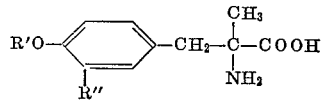

and

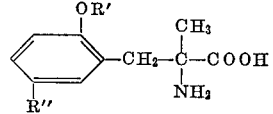

where R′ stands for a methyl group or a hydrogen atom, and R″ for fluorine or chlorine and particularly α-methyl-3-fluoro-4-methoxyphenylalanine and α-methyl-3-chloro-4-methoxyphenylalanine.

The new compounds are prepared by known methods; advantageously, a hydantoin of the formula

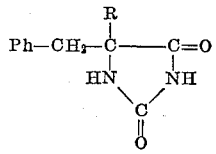

where Ph and R have the above meanings, is hydrolyzed, for example with the use of an alkaline agent.

According to another process for the manufacture the new compounds are prepared by hydrolyzing a compound of the formula

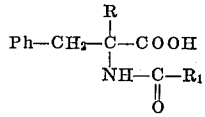

in which Ph and R have the above meanings and $R_1$ stands for lower alkyl radical especially for methyl.

When the reaction product contains an esterified or etherified hydroxyl group or an acylated amino group, for example an alkoxy, benzyloxy or carbobenzoxy group, it may, if desired, be subsequently split in the usual manner, for example by hydrolysis or hydrogenolysis, to yield a free hydroxy or amino group.

Alternatively, the hydrolysis of an alkoxy group situated on the phenyl radical may take place simultaneously with that of the main process. For example, a corresponding hydantoin may be treated with hydriodic or hydrobromic acid, e.g., with aqueous hydrobromic acid of 48% strength.

The reactions according to the present invention are carried out in the usual manner, in the presence or absence of diluents, condensing agents and/or catalysts, at room temperature or with heating or cooling, if desired under superatmospheric pressure.

Depending on the starting materials and the reaction conditions used, the new compounds are obtained in the free form or in the form of their salts, which also form part of this invention. It is possible to obtain, e.g., basic, neutral, acid or mixed salts, in some cases also hemi-, mono-, sesqui- or polyhydrates. The salts of the new compounds can be transformed in known manner into the free compounds: acid addition salts for instance by reaction with a basic agent or an ion exchanger, metal salts by reaction with an acidic agent. On the other hand, a resulting free compound may form salts with inorganic or organic acids or, e.g., with therapeutically acceptable bases or metals, for example alkali metals or alkaline earth metals. Acid addition salts are preferably manufactured with therapeutically acceptable acids, for example hydrohalic, sulfuric, phosphoric, nitric, perchloric acids; aliphatic, alicyclic, aromatic or heterocyclic carboxylic or sulfonic acids, such as formic, acetic, propionic, succinic, glycolic, lactic, malic, tartaric citric, ascorbic, maleic, hydroxymaleic or pyruvic acid; phenylacetic, benzoic, para-aminobenzoic, anthranicic, para-hydroxybenzoic, salicylic, or para-aminosalicylic acid, embonic, methanesulfonic, ethanesulfonic, hydroxyethanesulfonic, ethylenesulfonic acid; halogenbenzenesulfonic, toluenesulfonic, naphthalene-sulfonic or sulfanilic acid; methionin, tryptophane, lysin or arginin.

The resulting free compounds can be purified by being converted into these or other salts, for example the picrates, which are then isolated and the free compounds liberated.

In view of the close relation between the new compounds in the free form and in the form of a salt thereof, whenever a free case is referred to in this context, a corresponding salt is also intended provided such is possible or applicable under the circumstances.

The new compounds may be in the form of racemates or of mixtures of racemates which can be separated or resolved into the optical antipoles in the usual manner.

The invention also comprises any modification of the process in which a starting material is formed under the reaction conditions or in which an intermediate product obtainable at any stage of the complete process is used as starting material and the remaining step or steps is or are performed, or in which the process is discontinued at any stage thereof.

Advantageously those starting materials are used that lead to compounds described above as being particularly valuable.

The starting materials are known or can be prepared in known manner. For example, compounds of the formula

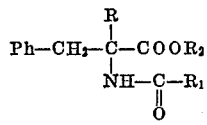

in which Ph and R have the meanings given above, $R_1$ stands for a lower alkyl radical, and $R_2$ for a lower alkyl radical, can be obtained by rearranging a compound of the formula

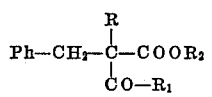

in which Ph, R, $R_1$ and $R_2$ have the meanings given above, for example according to Schmidt by treatment with hydrazoic acid.

From the resulting acylamino esters the acylamino acids can be obtained by partial hydrolysis.

The new compounds are intended to be used in the form of pharmaceutical preparations containing them in conjunction or admixture with a organic or inorganic, solid or liquid, pharmaceutical excipient suitable for enteral (for example oral) or parenteral administration. Suitable excipients are substances that do not react with the new compounds, for example water, gelatin, lactose, starches, magnesium stearate, talcum, vegetable oils, benzyl alcohols, gums, polyalkylene glycols, choloesterol or other known medicinal excipients. The pharmaceutical preparations may be, for example, tablets, pills or capsules, or in liquid form solutions, suspensions or emulsions. If desired, they may be sterilized and/or may contain assistants such as preserving, stabilizing, wetting or emulsifying agents, salts for regulating the osmotic pressure, or buffers. They may also contain further therapeutically valuable substances, for example other antihypertensive agents, more especially Rauwolfia alkaloids such as reserpine, rescinnamine or deserpidine and similar compounds such as syrosingopine, veratrum alkaloids such as germine or protoveratrine, or above all synthetic antihypertensive drugs such as chloro thiazide, hydrochlorothiazide, cyclopenthiazide or analogous compounds, 1-keto-3-(3'-sulfamyl-4'-chlorophenyl) - 3 - hydroxyisolindoline, hydralazine, dihydralazine, guanethidine or ganglion blockers, such as chlorisondamine.

The following examples illustrate the invention.

EXAMPLE 1

A mixture of 22.5 g. of crude 4-methyl-4-(3'-fluoro-4'-methoxybenzyl)hydantoin, 650 cc. of water and 130 g. of barium hydroxide octahydrate is stirred and refluxed for 2 days and then poured into 2 liters of water. The pH value is adjusted to 1–2 by adding 2 N-sulfuric acid, the whole is stirred for sometime and then suctioned through Celite, and the clear filtrate is evaporated to dryness under vacuum. The oily residue is mixed with 200 cc. of aqueous acetic acid of 10% strength and 100 cc. of methanol, refluxed for 2 hours, a little undissolved material is suctioned off and rinsed with 100 cc. of aqueous acetic acid of 10% strength. The filtrate is concentrated to 150 cc. and this solution is percolated through a column of 200 g. of a weakly basic ion exchange resin in the acetate form, and the column is rinsed with aqueous acetic acid of 10% strength. The eluate, which is free from sulfate ions, is evaporated, to yield α-methyl-3-fluoro-4-methoxyphenylalanine of the formula

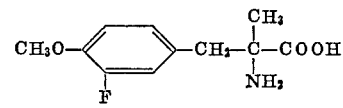

in the form of colorless crystals which, after recrystallization from water, melt at 268 to 270° C. with decomposition.

The starting material is prepared in the following way:

A stirring flask is charged with 126 g. of orthofluoroanisole, 120 cc. of aqueous formaldehyde solution of 37 to 40% strength, 120 cc. of ether, 12 g. of zinc chloride and 2 g. of sodium chloride, and while stirring and occasionally cooling gaseous hydrobromic acid is introduced at 20 to 25° to saturation (8 hours). The two-phase, yellow-red suspension is kept for 2 days at room temperature, then poured with stirring into 600 g. of ice water and extracted with 3× 400 cc. of ether. The ethereal extracts are washed once with sodium bicarbonate solution, dried over anhydrous sodium sulfate and then evaporated to dryness under vacuum at a temperature not exceeding 40° C., to yield 215.2 g. of 3-fluoro-4-methoxybenzylbromide as an oil which crystallises spontaneously. 100 g. of potassium cyanide, 200 cc. of water and 500 cc. of alcohol are then added, and the mixture is stirred for 30 minutes at room temperature, with the temperature rising spontaneously to 60° C. After having been refluxed for 2 hours, the batch is cooled, 300 cc. of water are added and the alcohol is expelled by evaporation under vacuum. The residue is then extracted with 3× 400 cc. of ether. The ethereal solution is washed once with water, dried over sodium sulfate and evaporated, to yield an oil which is distilled under a high vacuum. After a forerunning (boiling at 80 to 100° C. under 0.7 mm. Hg pressure) a colorless oil is obtained which boils at 99 to 105° C. under 0.5 mm. Hg pressure and crystallizes spontaneously. On recrystallization from methanol 3-fluoro-4-methoxybenzylcyanide is obtained in the form of colorless crystals melting at 47 to 48° C.

A solution of 33 g. of 3-fluoro-4-methoxybenzylcyanide in 60 cc. of ethyl acetate is stirred dropwise into a solution of 14 g. of sodium in 200 cc. of absolute alcohol, while the temperature is maintained at about 65° C. The solution turns dark and towards the end of the dropwise addition crystals appear. The batch is then refluxed for 4 hours, cooled to 0° C., and the precipitated crystals are suctioned off and dissolved in 200 cc. of water. While the batch is cooled vigorously, 50 cc. of glacial acetic acid are added and after some standing the precipitated crystals are suctioned off at 0° C. On recrystallization from methanol, α-cyano-α-(3-fluoro-4-methoxyphenyl)acetone is obtained in colorless crystals melting at 125–127° C.

30 g. of α-cyano-α-(3-fluoro-4-methoxyphenyl)acetone are stirred portionwise within 30 minutes with cooling into a mixture of 20 cc. of water and 80 cc. of concentrated sulfuric acid; the resulting suspension is stirred for 10 minutes at 80° C., then cooled, and 310 cc. of water are cautiously added at 0° C. The resulting suspension is refluxed for 3 hours, then cooled, and extracted with 3× 100 cc. of ether. The ethereal solution is washed once with aqueous sodium bicarbonate solution and once with water, dried, and evaporated. The residual oil is distilled under a high vacuum and yields 3-fluoro-4-methoxyphenylacetone as a colorless oil boiling at 88 to 89° C. under 0.2 mm. Hg pressure.

A solution of 100 g. of ammonium carbonate and 10 g. of potassium cyanide in 300 cc. of water is boiled in a stirring flask to 50° C. A solution of 21.5 g. of 3-fluoro-4-methoxyphenylacetone in 300 cc. of alcohol is then added, and the whole is stirred for 10 hours at 60° C. When the clear solution is concentrated to a small volume, 4-methyl-4(3'-fluoro-4'-methoxybenzyl)hydantoin is obtained in colorless crystals melting at 188–189° C. The pure product, obtained by recrystallization from water, melts at 189–191° C.

The 3-fluoro-4-methoxyphenylacetone used as intermediate can alternatively be prepared in the following way:

A solution of 17 g. of bromine in 50 cc. of glacial acetic acid is stirred dropwise at 20 to 30° C. into a solution of 12.6 g. of ortho-fluoroanisole in 100 cc. of glacial acetic acid. The solution is left to itself for 2 hours and then evaporated under vacuum; the residue is dissolved in ether, washed once with aqueous sodium bicarbonate solution and once with water, dried and evaporated to dryness. The residual oil is distilled and yields 2-fluoro-4-bromoanisole as a colorless oil boiling at 96 to 98° C. under 12 mm. Hg pressure. 25 cc. of absolute ether are added to 11.5 g. of this substance and this solution is added dropwise to a stirred suspension of 1.5 g. of magnesium etched with a small amount of iodine and 25 cc. of absolute ether. The resulting green suspension is boiled for ½ hour, then cooled, and 5.5 g. of chloroacetone in 20 cc. of absolute ether are stirred in dropwise. The ether is then expelled by gentle heading and the residue is heated for 1 hour at 150° C. After cooling, the resulting dark substance is extracted with chloroform, the extract is washed once with water, dried and evaporated. The residual oil is distilled and yields 3-fluoro-4-methoxyphenylacetone as a faintly yellowish oil boiling at 81 to 82° C. under 0.15 mm. Hg pressure.

EXAMPLE 2

A mixture of 10.2 g. of α-methyl-3-fluoro-4-methoxyphenylalanine and 100 cc. of aqueous hydrobromic acid of 48% strength is refluxed for 40 hours and then evaporated to dryness under vacuum. The residue is repeatedly mixed with water, and the paste is each time evaporated to dryness. The crystalline residue is mixed with 100 cc. of warm water, 5 cc. of aqueous sodium carbonate solution of 5% strength are added and the whole is cooled to 0° C. The colorless crystals are suctioned off and dried, to yield α-methyl-3-fluoro-hydroxyphenylalanine of the formula

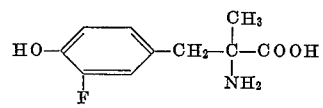

as colorless crystals melting at 315–317° C. with decomposition. The product can be recrystallized from aqueous acetic acid of 50% strength without the melting point changing.

EXAMPLE 3

A solution of 1.5 g. of N-acetyl-α-methyl-2-methoxy-5-fluorophenylalanine in a mixture of 10 cc. of glacial acetic acid, 10 cc. of water and 10 cc. of concentrated hydrochloric acid is refluxed for 4 hours and then evaporated to dryness. The crystalline residue is dissolved in aqueous acetic acid of 10% strength and percolated through a column of 20 g. of a weakly basic ion exchange resin in the acetate form and the column is rinsed with aqueous acetic acid of 10% strength. The eluate is evaporated to dryness under vacuum and the residue is recrystallized from alcohol+ether, to yield α-methyl-2-methoxy-5-fluorophenylalanine as colorless crystals melting at 237–239° C. of the formula

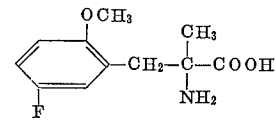

The N-acetyl-α-methyl-2-methoxy-5-fluorophenylalanine used as starting material can be prepared in the following manner:

43 g. of α-methylacetic acid ethyl ester are added at room temperature to a solution of 6.9 g. of sodium in 200 cc. of absolute alcohol, and the whole is stirred for some time. The resulting crystal suspension is mixed with a solution of 55 g. of 2-methoxy-5-fluorobenzylbromide in 100 cc. of absolute alcohol and the whole is stirred and refluxed for 4 hours, then cooled, suction-filtered and rinsed with absolute alcohol. The filtrate is evaporated to dryness, and the residue is taken up in ether and washed with water. The ethereal solution is dried and evaporated to dryness, the residue being distilled. The oil which passes over at 120 to 128° C. under 0.25 mm. Hg pressure crystallizes spontaneously. After recrystallization from a small amount of isopropanol, α-acetyl-α-methyl-β-(2-methoxy-5-fluorophenyl)propionic acid ethyl ester is obtained in the form of colorless crystals melting at 56 to 57° C.

A solution of 28.2 g. of α-acetyl-α-methyl-β-(2-methoxy-5-fluorophenyl)propionic acid ethyl ester in 200 cc. of absolute benzene is mixed with 100 cc. of concentrated sulfuric acid, and 8 g. of sodium azide are then stirred in portionwise in the course of 1 hour. Each addition produces a strong evolution of gas and the temperature rises to a maximum of 40° C. On completion of the addition the batch is stirred on for 30 minutes. The sulfuric acid solution is then isolated, washed once with absolute benzene and 200 cc. of chloroform are then added. While stirring and efficiently cooling the batch (maximum 10° C.), 150 g. of ice are cautiously added, and the batch is neutralized with dilute aqueous sodium hydroxide solution. The layers are then separated in a separating funnel. The chloroform solution is washed with water, dried and evaporated to dryness, to yield Component A. The aqueous layer is acidified and dried with chloroform; the chloroform extracts are washed with water, dried and evaporated to dryness, to yield Component B.

Component A yields colorless crystals which are recrystallized from ether. N-acetyl-α-methyl-2-methoxy-5-fluorophenylalanine ethyl ester is thus obtained in the form of colorless crystals melting at 121–122° C.

Component B forms brown crystals which are recrystallized from acetonitrile, to yield N-acetyl-α-methyl-2-methoxy-5-fluorophenylalanine in the form of colorless crystals melting at 201 to 202° C.

A solution of 50 g. of potassium hydroxide in 500 cc. of methanol is mixed with 43.2 g. of N-acetyl-α-methyl-2-methoxy-5-fluorophenylalanine ethyl ester; the whole is refluxed for 2 hours and then evaporated. The residue is dissolved in 250 cc. of water, this solution is washed with ether and then acidified with 100 cc. of concentrated hydrochloric acid. The precipitated crystals are suctioned off, washed with water, dried and recrystallized from acetonitrile, to yield N-acetyl-α-methyl-2-methoxy-5-fluorophenylalanine, in the form of colorless crystals melting at 201 to 202° C., which is identical with the material obtained as Component B.

EXAMPLE 4

A solution of 1.5 g. of N-acetyl-α-methyl-2-methoxy-5-fluorophenylalanine in 20 cc. of aqueous hydrobromic acid of 48% strength is refluxed for 24 hours and then evaporated to dryness under vacuum. The residue is dissolved in 20 cc. of water, neutralized with aqueous sodium bicarbonate solution and adjusted with glacial acetic acid to pH=4. At 0° C. crystallization sets in. The crystals are suctioned off, washed with water and recrystallized from water, to yield α-methyl-2-hydroxy-5-fluorophenylalanine in the form of colorless crystals melting at 290° C. with decomposition, corresponding to the formula

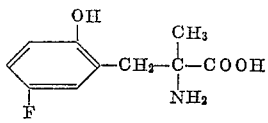

EXAMPLE 5

A mixture of 48.8 grams of 4-methyl-4-(3'-chloro-4'-methoxybenzyl)hydrantoin and 250 grams of barium hydroxide octahydrate is boiled under reflux in 1 litre of water for 60 hours with stirring. After cooling, 1 litre of water and 100 grams of concentrated sulphuric acid are added, the whole stirred for some time at room temperature and then filtered with suction. The filtrate is evaporated to 500 cc. in vacuo, and 300 cc. of 2 N-sodium hydroxide solution added. By the addition of a little glacial acetic acid the pH value is adjusted to 3–4, and the mixture is allowed to stand at 0° C. The precipitated crystals are filtered with suction, washed thoroughly with water and then purified by being dissolved in dilute sodium hydroxide solution and precipitated by the addition of glacial acetic acid. There is obtained α-methyl-3-chloro-4-methoxyphenylalanine of the formula

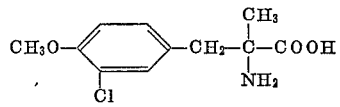

in the form of colourless crystals melting at 257–259° C. with decomposition.

The starting materials may be prepared, for example, as follows:

A mixture of 250 grams of ortho-chloranisole, 215 cc. of ether, 215 cc. of aqueous formaldehyde solution of 37–40% strength, 20 grams of zinc chloride and a little sodium chloride is treated with stirring and occasional cooling (20–25° C.) for 12 hours with gaseous hydrochloric acid and then allowed to stand for 48 hours. The reaction mixture is diluted with water and extracted with ether to yield an oil which is distilled in a high vacuum. There is obtained 3-chloro-4-methoxybenzyl chloride as a colourless liquid boiling at 80–82° C. under 0.2 mm. pressure of mercury.

To a solution of 191 grams of the above substance in 1 litre of acetone there are added 20 grams of sodium iodide and 120 grams of sodium cyanide and the whole is boiled overnight with stirring. After cooling, the mixture is filtered with suction and washed with acetone. The filtrate is evaporated to dryness, the residue taken up in ether and washed twice with water. The ether solution is then dried and evaporated to dryness. The residue is distilled in a high vacuum and the oil passing over at 120–130° C. under 0.4 mm. pressure of mercury is crystallized from ether. There is obtained 3-chloro-4-methoxybenzyl cyanide in the form of colourless crystals melting at 52–55° C.

70 grams of the above substance are dissolved in 115 cc. of absolute ethyl acetate and this solution is added dropwise with stirring to a solution of 27 grams of sodium in 600 cc. of absolute alcohol. The mixture is then boiled under reflux for 4 hours, then half of the solvent is evaporated. The reaction mixture is then cooled, 200 cc. of water are added and then 100 cc. of glacial acetic acid and the resulting compact suspension stirred for some time at 0° C. The crystals are then filtered with suction, washed with water and 370 cc. of sulphuric acid of 85% strength then added. The resulting suspension is stirred for 10 minutes at 80° C., a clear solution being formed. After cooling, 1 litre of water is added to the reaction solution and the whole boiled under reflux with stirring for 3 hours, cooled, extracted three times with ether, dried, evaporated and distilled to yield 3-chloro-4-methoxyphenylacetone as a colourless oil boiling at 100–102° C. under 0.2 mm. pressure of mercury.

52.5 grams of the above substance are dissolved in 650 cc. of alcohol and added to a solution of 220 grams of ammonium carbonate and 22 grams of potassium cyanide in 650 cc. of water. The clear solution is stirred for 10 hours at 60° C., the alcohol evaporated and, after cooling to 0° C., filtered with suction. The resulting crystals are recrystallized from 500 cc. of isopropanol to yield 4-methyl-4-(3' - chloro-4' - methoxybenzyl)hydantoin as colourless crystals melting at 198–200° C.

EXAMPLE 6

A mixture of 15 cc. of glacial acetic acid, water and concentrated hydrochloric acid (1:1:1) is added to 0.45 gram of α-methyl-N-acetyl-3-chloro-4-methoxyphenylalanine, and the whole is boiled under reflux for 5 hours. The clear solution is then evaporated to dryness in vacuo. The residue is dissolved in water, the pH value of the solution is adjusted to 3–4, and the reaction mixture allowed to stand at 0° C. The precipitated, colourless, crystalline substance is identical in every respect with α-methyl-3-chloro-4 - methoxyphenylalanine obtained according to Example 5.

The starting material may be obtained, for example, as follows:

To a solution of 50 grams of α-methyl-acetacetic acid ethyl ester in 300 cc. of absolute toluene there are added 8 grams of sodium hydride and, after stirring for half an hour, 58.5 grams of 3-chloro-4-methoxybenzyl chloride in 100 cc. of absolute toluene. The reaction mixture is boiled overnight under reflux and then added to a cooled solution of 200 cc. of water and, the organic layer is separated, dried and evaporated. The residue is distilled to yield α-methyl-α-acetyl-β-(3-chloro-4-methoxyphenyl)propionic acid ethyl ester as a colourless oil boiling at 126–133° C. under 0.3 mm. pressure of mercury.

71.2 grams of the above substance are added to a mixture of 150 cc. of concentrated sulphuric acid and 200 cc. of absolute benzene, and 17 grams of sodium azide are added in portions in the course of 90 minutes with stirring. When the addition is complete, stirring is continued for 30 minutes, and the mixture is then allowed to stand until the layers have separated; the upper benzolic layer is then filtered with suction. The remaining sulphuric acid is washed twice in the same manner with benzene, then covered with 500 cc. of chloroform and intensively cooled. 1 litre of water in all is then added at a temperature below 0° C., with stirring, the layers are separated in a separating funnel, and the organic extract washed twice with dilute sodium hydroxide solution and once with water. After drying and evaporation, a viscous oil is obtained which is dissolved with 100 cc. of methanolic potassium hydroxide solution of 10% strength. The resulting solution is boiled for 2 hours under reflux, then evaporated and the residue distributed in two steps between water and chloroform. The aqueous layer is acidified, cooled to 0° C., to yield colourless, crystalline α-methyl-N-acetyl-3-chloro-4 - methoxyphenylalanine which, after being recrystallized from isopropanol melts at 200° C.

EXAMPLE 7

A mixture of 8 grams of α-methyl-3-chloro-4-methoxyphenylalanine and 100 cc. of aqueous hydrobromic acid of 48% strength is boiled for 48 hours under reflux. The solution is then evaporated to dryness in vacuo, the residue dissolved in water, the pH value of the solution adjusted to 4 and the whole allowed to stand at 0° C. The precipitated, colourless crystals are filtered with suction and recrystallized from 2 litres of water to yield α-methyl-3-chloro-4-hydroxyphenylalanine of the formula

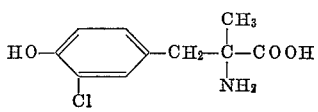

melting at 285° C. with decomposition.

EXAMPLE 8

A mixture of 8.2 grams of 4-ethyl-4-(3'-chloro-4'-methoxybenzyl)hydantoin and 40 grams of barium hydroxide octahydrate in 200 cc. of water is boiled under reflux for 60 hours and then poured with stirring into 500 cc. of water. After the addition of 16 grams of concentrated sulfuric acid, the reaction mixture is stirred for some time and then filtered with suction. The filtrate is evaporated to 200 cc., then treated with a weakly acid ion exchange resin and evaporated to dryness. The colorless, crystalline residue is recrystallized from water to yield α-ethyl-3-chloro-4-methoxyphenylalanine of the formula

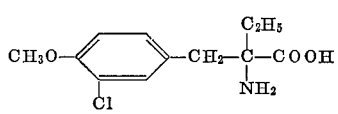

melting at 243–246° C. with decomposition.

The starting material may be obtained, for example, as follows:

2.5 grams of sodium hydride are added to a solution of 18.1 grams of 3-chloro-4-methoxybenzyl cyanide in 200 cc. of absolute toluene and, after stirring for half an hour, a solution of 15 grams of propionic acid ethyl ester in 50 cc. of absolute toluene is added dropwise. The whole is then boiled under reflux for 6 hours, cooled to 5° C., and 100 cc. of 2 N-hydrochloric acid added. The precipitated crystals are filtered with suction and recrystallized from alcohol to yield 1-cyano-1-(3-chloro-4-methoxyphenyl)butanone-(2) melting at 111–113° C.

37 cc. of suphuric acid of 85% strength are added to 10 grams of the above substance, the mixture heated until solution is complete, and 100 cc. of water are then added. After boiling the reaction mixture for 3 hours under reflux, it is cooled and extracted with ether to yield an oil which, on being distilled, yields 1-(3-chloro-4-methoxy-phenyl)butanone-(2) as a colourless oil boiling at 105–107° C. under 0.2 mm. pressure of mercury.

7 grams of the above substance are dissolved in 80 cc. of alcohol and the solution added to a solution of 27 grams of ammonium carbonate and 3 grams of potassium cyanide in 80 cc. of water. The reaction mixture is stirred for 10 hours at 60° C., and the alcohol evaporated; after cooling to 0° C., the precipitated crystals are filtered with suction and recrystallized from isopropanol to yield 4-ethyl-4-(3' - chloro - 4' - methoxybenzyl)hydantoin as colourless crystals melting at 189–190° C.

EXAMPLE 9

300 cc. of a mixture of glacial acetic acid, water and concentrated hydrochloric acid (1:1:1) are added to 17 grams of α-methyl-N-acetyl-2-methoxy-5-chlorophenylalanine, and the whole boiled under reflux for 5 hours. The clear solution is evaporated to dryness in vacuo, the residue dissolved in 250 cc. of 2 N-acetic acid and the solution slowly percolated through a column of 150 grams of weakly alkaline ion exchanger resin in the acetate form and rinsed with 2 N-acetic acid. The eluate is evaporated. The colourless, crystalline residue is recrystallized from 200 cc. of water to yield α-methyl-2-methoxy-5-chlorophenylalanine of the formula

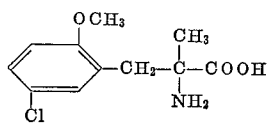

melting at 252–253° C. with decomposition.

The starting material is obtained, for example, as follows:

2.5 grams of sodium hydride and then 19 grams of 2-methoxy-5-chlorobenzyl chloride are added to a solution of 15 grams of α-methyl-acetacetic acid ethyl ester in 200 cc. of absolute toluene. The mixture is boiled under reflux overnight, then cooled, the reaction solution washed with water and evaporated to dryness. The residue is distilled to yield α-methyl-α-acetyl-β-(2-methoxy-5-chlorophenyl)propionic acid ethyl ester as a colourless oil boiling at 136–139° C. under 0.3 mm. pressure of mercury.

25 cc. of concentrated sulphuric acid and 25 cc. of absolute benzene are added to 11.5 grams of the above substance and, while stirring, 3.1 grams of sodium azide are added in portions in the course of 45 minutes. When the addition is complete, stirring is continued until the reaction subsides. The benzene is then separated, the sulphuric acid washed twice with benzene and 100 cc. of chloroform are then added. While cooling intensively, 250 cc. of water are slowly added at a temperature below 0° C. The layers are separated, the chloroform layer is washed with sodium hydroxide solution and water and, after being dried, evaporated. The crystalline residue is recrystallized from ether to yield α-methyl-N-acetyl-2-methoxy-5-chlorophenylalanine ethyl ester of the formula

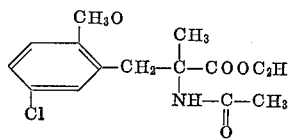

melting at 107–108° C.

To a solution of 50 grams of potassium hydroxide in 500 cc. of methanol there are added 45 grams of α-methyl-N-acetyl-2-methoxy-5-chlorophenylalanine ethyl ester and the whole is boiled under reflux for 2 hours. The clear solution is then evaporated to dryness. The residue is dissolved in 250 cc. of water and 100 cc. of concentrated hydrochloric acid are added. A rapidly crystallizing colourless oil separates which, after recrystallization from a mixture of acetone and petroleum ether, shows a double melting point at 167–168° C. and 194–196° C. The product is α-methyl-N-acetyl-2-methoxy-5-chlorophenylalanine of the formula

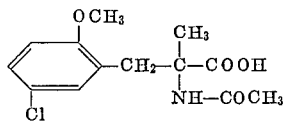

EXAMPLE 10

A solution of 15 grams of α-methyl-N-acetyl-2-methoxy-5-chlorophenylalanine in 200 cc. of aqueous hydrobromic acid of 48% strength is boiled under reflux for 44 hours and then evaporated to dryness in vacuo. The residue is dissolved in water and treated with a weakly alkaline ion exchange resin. The reaction mixture is evaporated to yield α-methyl-2-hydroxy-5-chlorophenylalanine of the formula

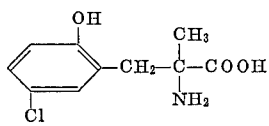

melting at 327° C. with decomposition.

EXAMPLE 11

A solution of 8.5 grams of α-ethyl-N-acetyl-2-methoxy-5-chlorophenylalanine in 300 cc. of a mixture of water, glacial acetic acid and concentrated hydrochloric acid (1:1:1) is boiled for 6 hours under reflux and then evaporated to dryness in vacuo. The residue is dissolved in water, treated with a weakly alkaline ion exchange resin and evaporated to dryness. The colourless, crystalline residue is recrystallized from water to yield α-ethyl-2-methoxy-5-chlorophenylalanine of the formula

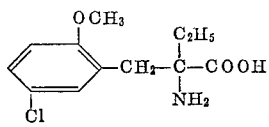

melting at 250° C. with decomposition.

The starting material may be obtained, for example, by the method described in Example 9, in the first step α-ethyl-acetacetic acid ethyl ester being used instead of α-methyl-acetacetic acid ethyl ester. In an analogous manner α-ethyl-α-acetyl-β-(2-methoxy-5-chlorophenyl)propionic acid ethyl ester is obtained as a colourless oil boiling at 130–135° C. under 0.15 mm. pressure of mercury from which, in exactly the same manner as described in Example 9, α-ethyl-N-acetyl-2-methoxy-5-chlorophenylalanine ethyl ester melting at 93–94° C. (from a mixture of ether and petroleum ether) is obtained which, when hydrolysed (as in Example 9) yields α-ethyl-N-acetyl-2-methoxy-5-chlorophenylalanine melting at 210–212° C. (from acetone).

EXAMPLE 12

A mixture of 29.5 grams of 4-methyl-4-(3'-bromo-4'-methoxybenzyl)hydantoin and 130 grams of barium hydroxide octahydrate in 650 cc. of water is boiled for 60 hours under reflux, then poured on to 3 litres of water, 41 grams of concentrated sulphuric acid and 20 cc. of glacial acetic acid are added and the whole stirred for some time. The reaction mixture is then filtered with suction and the filtrate evaporated to 100 cc. The solution is adjusted to pH=4, is allowed to stand at 0° C. and the precipitated colourless crystals are filtered with suction. The crystals are dissolved in dilute sodium hydroxide solution and precipitated with glacial acetic acid to yield pure α-methyl-3-bromo-4-methoxyphenylalanine of the formula

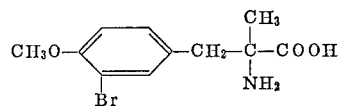

melting at 269–272° C. with decomposition.

The starting material may be obtained, for example, as follows:

A mixture of 188 grams of orthobromanisole, 120 cc. of aqueous formaldehyde solution of 37–40% strength, 120 cc. of ether, 10 grams of zinc chloride and a little sodium chloride is treated for 8 hours at 20–25° C. with stirring, with gaseous hydrobromic acid and then allowed to stand for 2 days. Water is then added, the reaction mixture is extracted with ether; an oil is obtained which crystallizes spontaneously. The crystals are recrystallized from isopropanol to yield 3-bromo-4-methoxybenzyl bromide as colourless crystals melting at 63° C.

159 grams of the above compound are dissolved in 400 cc. of ethylene glycol, 80 grams of potassium cyanide are added and the whole is stirred overnight at 110° C. The reaction mixture is then poured into ample water, extracted several times with ether to yield a dark oil which is distilled. The fraction passing over at 129–134° C. under 0.2 mm. pressure of mercury crystallizes and is recrystallized from isopropanol to yield 3-bromo-4-methoxybenzylcyanide as colourless crystals melting at 53–55° C.

60 grams of the above substance are dissolved in 75 cc. of absolute ethyl acetate and the solution added dropwise and with stirring to a solution of 19.3 grams of sodium in 450 cc. of absolute alcohol. The reaction mixture is then boiled under reflux for 4 hours, cooled, poured on to a mixture of ice and water, and 50 cc. of glacial acetic acid added. The precipitated crystalline substance melting at 147–149° C. (crude 1-cyano(3-bromo-4-methoxyphenyl)acetone) is treated with 200 cc. of sulphuric acid of 85% strength, then heated for a short time at 100° C. until dissolution is complete, diluted with 650 cc. of water and then boiled under reflux for 3 hours. The precipitated oil is separated after being cooled and then distilled to yield 3-bromo-4-methoxyphenylacetone as a colourless oil boiling at 120–122° C. under 0.2 mm. pressure of mercury.

25 grams of the above substance are dissolved in 300 cc. of alcohol and the solution added to a solution of 100 grams of ammonium carbonate and 10 grams of potassium cyanide in 300 cc. of water. After the reaction mixture has been stirred for 10 hours, the alcohol is dispelled, cooled to 0° C. and filtered with suction. By recrystallization from alcohol there is obtained 4-methyl-4-(3'-bromo-4'-methoxyphenyl)hydantoin in the form of colourless crystals melting at 227–228° C.

EXAMPLE 13

A mixture of 300 cc. of water, glacial acetic acid and concentrated hydrochloric acid (1:1:1) is added to 14.4 grams of α-methyl-N-acetyl-2-methoxy-5-bromophenylalanine, and the whole is then boiled under reflux for 5 hours and evaporated to dryness. The residue is dissolved in 100 cc. of water and a solution of a weakly alkaline liquid ion exchange resin in twice its volume of petroleum ether is added. After mixing thoroughly, crystals are formed which are filtered with suction and well washed with water and petroleum ether. By recrystallization from 250 cc. of water there is obtained α-methyl-2-methoxy-5-bromophenylalanine of the formula

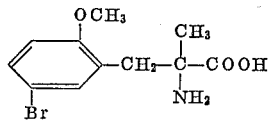

in the form of colourless crystals melting at 239–240° C. with decomposition.

For the preparation of the starting material the same procedure may be used, for example, as in Example 9, 2-methoxy-5-bromobenzyl bromide being used instead of 2-methoxy-5-chlorobenzyl chloride. By condensation with α-methyl-acetoacetic acid ethyl ester there is obtained α - methyl - α - acetyl - β - (2 - methoxy - 5 - bromophenyl)propionic acid ethyl ester as a colourless oil boiling at 145–148° C. under 0.2 mm. pressure of mercury, which may be rearranged to form α-methyl-N-acetyl-2-methoxy-5-bromophenylalanine ethyl ester of the formula

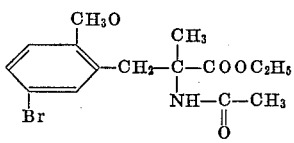

melting at 107–109° C. (from ether) in the same manner as described in Example 9.

30 grams of α-methyl-N-acetyl-2-methoxy-5-bromophenylalanine ethyl ester are added to a solution of 30 grams of potassium hydroxide in 300 cc. of methanol and the whole is boiled for 2 hours under reflux. The reaction mixture is then evaporated te dryness and the residue taken up in water. The solution is washed with chloroform and then rendered strongly acid. An oil precipitates which crystallizes. By filtration with suction and recrystallization from a mixture of isopropanol and petroleum ether there is obtained α-methyl-N-acetyl-2-methoxy-5-bromophenylalanine of the formula

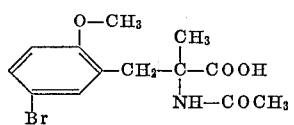

in the form of colourless crystals melting at 197–199° C.

EXAMPLE 14

27.2 grams of α-n-butyl-N-acetyl-2-methoxy-5-chlorophenylalanine are treated with 300 cc. of a 1:1:1-mixture of water, glacial acetic acid, and concentrated hydrochloric acid, and the whole refluxed overnight. The batch is then evaporated to dryness under reduced pressure. The residue is dissolved in 250 cc. of water, and to the solution are added 250 cc. of a 30% solution of a liquid, slightly basic ion exchanger in petroleum ether. After vigorous agitation crystallization sets in. The crystals are filtered off with suction and washed well with ether. They are dissolved in 100 cc. of 2 N-sodium hydroxide solution, filtered and the filtrate treated with 25 cc. of glacial acetic acid. The crystals that precipitate at 0° C. are filtered off with suction, and washed well with water, isopropanol and ether. The α-n-butyl-2-methoxy-5-chlorophenylalanine of the formula

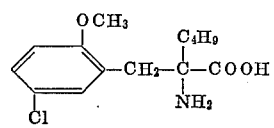

is obtained in the form of colorless crystals melting at 248–249° C. (with decomposition).

The starting material is obtained for example as follows:

A solution of 40 grams of α-n-butyl-acetic acid-ethyl ester in 300 cc. of absolute toluene is stirred well while 5 grams of sodium hydride are carefully added in small portions, followed by 38 grams of 2-methoxy-5-chlorobenzyl chloride. The mixture is refluxed overnight, cooled, and treated with 200 cc. of water. The toluene layer is dried and evaporated to dryness to obtain an oil which is distilled under a high vacuum. The fraction which passes over at 150–160° C. (under a pressure of 0.25 mm. Hg), a yellowish oil, is α-n-butyl-α-acetyl-β-(2-methoxy-5-chlorophenyl)propionic acid ethyl ester.

55.3 grams of this substance are treated with a mixture of 100 cc. of benzene and 100 cc. of concentrated sulfuric acid. After this, 12 grams of sodium azide are then added in portions, while stirring in such manner that the temperature does not exceed 40° C. The batch is then stirred for another hour at room temperature. The benzene layer is then filtered off with suction, the concentrated sulfuric acid washed with 200 cc. of benzene and 500 cc. of chloroform then added. At a temperature below 0° C. 1 litre of water is then carefully added. The layers are separated and washed. The chloroform layer is washed twice with dilute sodium hydroxide solution and once with water. From the dilute sodium hydroxide solution there is obtained by acidification and extraction with chloroform α-n-butyl-N-acetyl-2-methoxy-5-chlorophenylalanine which, after being recrystallized from acetonitrile, melts at 210–211° C. From the chloroform portion there is obtained on drying and evaporation the α-n-butyl-N-acetyl-2-methoxy-5-chlorophenylalanine-ethyl ester which, after being recrystallized from acetone melts at 112–114° C.

31 grams of this substance are treated with a solution of 20 grams of potassium hydroxide in 200 cc. of methanol. The whole is refluxed for 2 hours, evaporated to dryness, and the residue treated with 200 cc. of water. The solution is rendered strongly acid, whereupon crystals precipitate. These are filtered off with suction and washed with water. The resulting α-n-butyl-N-acetyl-2-methoxy-5-chlorophenylalanine melts at 208–210° C.

EXAMPLE 15

A solution of 5 grams of α-n-butyl-2-methoxy-5-chlorophenylalanine in 50 cc. of 48% aqueous hydrobromic acid is refluxed for 48 hours. The reaction mass is then evaporated to dryness, the residue dissolved in 50 cc. of water, and the pH value adjusted to 4. The crystals that have formed at 0° C. are filtered off with suction and purified by recrystallization from a mixture of sodium hydroxide solution and glacial acetic acid. Colorless crystals of α-n-butyl-2-hydroxy-5-chlorophenylalanine of the formula

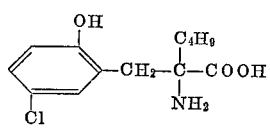

are obtained which melt at 290° C.

EXAMPLE 16

A mixture of 5.2 grams of 4-methyl-4-(3'-chloro-4' hydroxybenzyl)hydantoin and 30 grams of barium hydroxide-octahydrate in 150 cc. of water are refluxed for 5 days. After cooling, 15 cc. of concentrated sulfuric acid are added, the whole is stirred for 30 minutes and then filtered with suction through diatomaceous earth. The pH value of the filtrate is adjusted to 4. The crystals that precipitate are recrystallized from a large amount of water to obtain α-methyl-3-chloro-4-hydroxyphenylalanine of melting point 285–287° C., which is identical in every respect with the compound obtained according to Example 7.

The starting material may be obtained for example as follows:

At 20–25° C., gaseous hydrochloric acid is introduced for 8 hours into a mixture of 155 grams of orthochlorophenetol 120 cc. of 37–40% aqueous formaldehyde solution, 120 cc. of ether, 12 grams of zinc chloride and 2 grams of sodium chloride; the mixture is then allowed to stand for 2 days. 600 cc. of water and 30 cc. of ether are then admixed, the ethereal layer washed with aqueous sodium bicarbonate and water, dried and evaporated to obtain an oil which is distilled under a high vacuum. The fraction passing over at 87–89° C. (under a pressure of 0.2 mm. of Hg) is 3-chloro-4-ethoxybenzyl chloride.

112 grams of this substance are dissolved in 500 cc. of acetone, 65 grams of sodium cyanide and 10 grams of sodium iodide are added, and the mixture boiled and stirred overnight. Cooling is followed by suction-filtering. The filtrate is evaporated to dryness, the residue taken up in ether and washed with water. On drying and evaporation of the ethereal solution, crystals are obtained which on recrystallization from ether yield pure 3-chloro-4-ethoxybenzyl cyanide of melting point 66–69° C.

65 grams of this substance are dissolved in 100 cc. of absolute ethyl acetate and stirred dropwise into a solution of 7 grams of sodium in 200 cc. of absolute alcohol. The mixture is then boiled for 4 hours, evaporated and treated with 500 cc. of water and 85 cc. of glacial acetic acid. The crystals that precipitate at 0° C. are filtered off with suction, washed well with water, and recrystallized from 220 cc. of alcohol to obtain α-cyano-α-(3-chloro-4-ethoxyphenyl)acetone of melting point 128–130 C.

14 grams of this compound are treated with 200 cc. of 2 N-sulfuric acid and the whole refluxed for 3 hours. After cooling, the batch is extracted with ether and worked up as usual to obtain 3-chloro-4-hydroxyphenylacetone of melting point 78–80° C. (from ether/petroleum ether).

6.3 grams of this ketone are dissolved in 70 cc. of alcohol and treated with a solution of 25 grams of ammonium carbonate and 2.8 grams of potassium cyanide in 70 cc. of water. The batch is heated to 60° C. for 10 hours, the alcohol then evaporated, and, after cooling to 0° C., the precipitated crystals filtered off with suction. On recrystallization from water 4-methyl-4-(3'-chloro-4-hydroxybenzyl)hydantoin of melting point 201–202° C. is obtained.

What is claimed is:

1. A compound of the formula

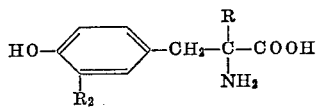

wherein R represents lower alkyl and $R_2$ halogen.

2. A compound of the formula

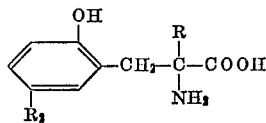

wherein R is lower alkyl, $R_1$ lower alkyl and $R_2$ halogen.

3. A compound of the formula

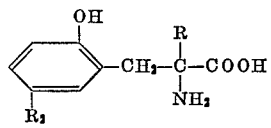

wherein R represents lower alkyl and $R_2$ halogen.

4. α-Methyl-3-fluoro-4-hydroxyphenylalanine.
5. α-Methyl-2-methoxy-5-fluorophenylalanine.
6. α-Methyl-2-hydroxy-5-fluorophenylalanine.
7. α-Methyl-3-chloro-4-hydroxyphenylalanine.
8. α-Methyl-2-methoxy-5-chlorophenylalanine.
9. α-Methyl-2-hydroxy-5-chlorophenylalanine.
10. α-Ethyl-2-methoxy-5-chlorophenylalanine.
11. α-Methyl-2-methoxy-5-bromophenylalanine.
12. α-n-Butyl-2-methoxy-5-chlorophenylalanine.
13. α-n-Butyl-2-hydroxy-5-chlorophenylalanine.

References Cited

UNITED STATES PATENTS 2,868,818  1/1959  Pfister et al. _____ 260—519
2,833,810  5/1958  Kissman et al.

LORRAINE A. WEINBERGER, *Primary Examiner.*

L. ARNOLD THAXTON, *Assistant Examiner.*

U.S. Cl. X.R.

260—309.5, 465, 471, 473, 479, 501.11, 590; 424—309

CASE 5134/1-4

PO-1050
(5/69)

UNITED STATES PATENT OFFICE
CERTIFICATE OF CORRECTION

Patent No. 3,454,629        Dated  July 8, 1969

Inventor(s) Hans Ulrich Daeniker

It is certified that error appears in the above-identified patent and that said Letters Patent are hereby corrected as shown below:

Column 16, the formula of claim 2 should read:

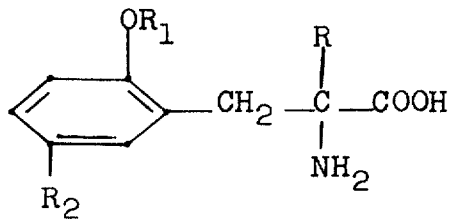

SIGNED AND
SEALED
DEC 8 1970

(SEAL)
Attest:

Edward M. Fletcher, Jr.
Attesting Officer

WILLIAM E. SCHUYLER, JR.
Commissioner of Patents